US012706505B2

(12) United States Patent
Enskonatus et al.

(10) Patent No.: US 12,706,505 B2
(45) Date of Patent: Aug. 11, 2026

(54) GENERATOR AND WIND POWER INSTALLATION

(71) Applicant: Wobben Properties GmbH, Aurich (DE)

(72) Inventors: Kai Enskonatus, Hinte (DE); Michael Müller, Südbrookmerland (DE); Alexander Philipp, Reilingen (DE)

(73) Assignee: Wobben Properties GmbH, Aurich (DE)

(*) Notice: Subject to any disclaimer, the term of this patent is extended or adjusted under 35 U.S.C. 154(b) by 275 days.

(21) Appl. No.: 17/966,377

(22) Filed: Oct. 14, 2022

(65) Prior Publication Data

US 2023/0122415 A1 Apr. 20, 2023

(30) Foreign Application Priority Data

Oct. 15, 2021 (EP) .................................... 21202897
Oct. 15, 2021 (EP) .................................... 21202908
Oct. 15, 2021 (EP) .................................... 21202916

(51) Int. Cl.
*H02K 5/20* (2006.01)
*F03D 9/25* (2016.01)
(Continued)

(52) U.S. Cl.
CPC ............... *H02K 5/207* (2021.01); *F03D 9/25* (2016.05); *H02K 5/24* (2013.01); *H02K 7/1838* (2013.01); *F05D 2220/76* (2013.01)

(58) Field of Classification Search
CPC ........ H02K 5/207; H02K 5/24; H02K 7/1838; H02K 9/06; F03D 9/25; F03D 80/60; F05D 2220/76; F05B 2220/706; Y02E 10/72
See application file for complete search history.

(56) References Cited

U.S. PATENT DOCUMENTS 4,035,711 A 7/1977 Piller
5,317,224 A 5/1994 Ragaly
(Continued)

FOREIGN PATENT DOCUMENTS

DE 102014208791 A1 11/2014
EP 2182618 A1 5/2010
(Continued)

*Primary Examiner* — Thomas Truong
(74) *Attorney, Agent, or Firm* — Seed Intellectual Property Law Group LLP

(57) ABSTRACT

A generator, in particular a generator for a wind power installation, the generator having: an air supply duct and a separate exhaust air chamber, in particular two or a plurality of exhaust air chambers, which are fluidically connected to the upstream air supply duct, a stator segment having a stator active unit and a rotor segment which is disposed so as to be rotatable relative to the stator segment about a rotation axis and has a rotor active unit, the rotor active unit and the stator active unit being disposed so as to be mutually spaced apart by an air gap by way of which the exhaust air chamber is fluidically connected to the upstream air supply duct, wherein an air-conveying device is disposed downstream of the exhaust air chamber that is configured for cooling the rotor active unit and the stator active unit, the air-conveying device for cooling the rotor active unit and the stator active unit supplying cooling air to the air gap by way of the air supply duct, and discharging from the air gap cooling air heated by the rotor active unit and the stator active unit by way of the exhaust air chamber, the exhaust air chamber being configured for discharging the heated cooling air in a radial direction in terms of the rotation axis.

15 Claims, 6 Drawing Sheets

(51) Int. Cl.
*H02K 5/24* (2006.01)
*H02K 7/18* (2006.01)

(56) References Cited

U.S. PATENT DOCUMENTS

| | | | | |
|---|---|---|---|---|
| 10,495,068 | B2 | 12/2019 | Airoldi | |
| 11,289,976 | B2 | 3/2022 | Ramtahal et al. | |
| 2007/0222223 | A1 | 9/2007 | Bagepalli et al. | |
| 2014/0346781 | A1* | 11/2014 | Airoldi | F03D 1/00<br>290/55 |
| 2015/0372565 | A1* | 12/2015 | Airoldi | F03D 9/25<br>290/55 |
| 2016/0233742 | A1* | 8/2016 | Airoldi | F03D 80/60 |
| 2018/0274522 | A1* | 9/2018 | Airoldi | F03D 80/82 |
| 2020/0368664 | A1* | 11/2020 | Koeger | F02M 35/024 |
| 2021/0036579 | A1 | 2/2021 | Ramtahal et al. | |
| 2022/0010813 | A1* | 1/2022 | Sugawara | F04D 29/665 |

FOREIGN PATENT DOCUMENTS

| | | | |
|---|---|---|---|
| EP | 3270491 | A1 | 1/2018 |
| EP | 3382199 | A1 | 10/2018 |
| EP | 3562002 | A1 | 10/2019 |
| EP | 3772160 | A1 | 2/2021 |
| FR | 2280235 | A1 | 2/1976 |
| GB | 2147948 | A | 5/1985 |
| JP | 2000089766 | A | 3/2000 |
| JP | 2005110359 | A | 4/2005 |

* cited by examiner

E

GENERATOR AND WIND POWER INSTALLATION

BACKGROUND

Technical Field

The invention relates to a generator, in particular a generator for a wind power installation. The invention furthermore relates to a wind power installation.

Description of the Related Art

Wind power installations emit noise during operation. The reason therefor is, for example, wind turbulences on the rotor blades of the wind power installations. Apparatuses within wind power installations also represent potential sources of noise during operation. A substantial source of noise is, for example, cooling devices which generate an air flow for cooling an (electric) generator of wind power installations, for instance. Turbulences which emit noise are also typically created as a result of the air flow being conveyed and deflected within the generator, in particular through narrow gaps and the like.

Humans and animals perceive noise in a specific frequency range as sound at a specific volume. The volume is characterized by the sound pressure level. Owing to statutory provisions, in order to protect humans and animals, wind power installations must not exceed a specific volume (critical value) during operation. The permissible critical value which must not be exceeded by a wind power installation usually depends on the location where the wind power installation is operated. For example, the critical value is typically lower in the proximity of built-up areas than away from the latter.

In order for the efficiency of wind power installations to be improved, the height of the hub and the diameter of the aerodynamic rotor of wind power installations are constantly increasing. However, the propagation of noise, and to this extent also the exposure to noise increases in the case of comparatively large wind power installations. Furthermore, the emission of noise of wind power installations can also increase as the size of the latter increases. A cause therefor can lie in the higher requirement in terms of cooling output for cooling the generator, because larger cooling devices, or more cooling devices, for example ventilators, which can provide an air flow having the required cooling output, may be required. The globally increasing average temperature is increasing the requirement for additional cooling output.

For cooling generators, it is known for the heated cooling air, which is to be discharged in order for the generator to be cooled, to be discharged from the generator in the radial direction by way of an annular gap on the external circumferential face. It is furthermore known, for supplying cooling air to a generator in the axial direction, for said cooling air to be guided in the axial direction through a rotor active unit and a stator active unit of a generator, and to be subsequently guided in the axial direction out of the generator. This is known from US Pat. Pub. No. 2007/0222223 A1, for example.

These known solutions have the advantage that they are comparatively space-saving and guide the cooling air within the generator by way of few/no deflections, i.e., with low resistance and comparatively low noise emission. Furthermore, a correspondingly open construction mode of the generator can avoid a requirement in terms of additional cooling systems.

However, this construction mode does not permit adequate damping of the generated noise. In particular, the noise emission of these generators cannot be adapted as a function of the critical noise emission values that apply at the operating location of the generator. A further negative effect in the case of the known solutions is that water and dirt can relatively easily enter the generator interior space. Consequently, servicing and maintenance work on these generators may be required at short intervals. There is thus the risk of the operation of such generators potentially becoming comparatively expensive.

BRIEF SUMMARY

Provided is a generator, in particular a generator for a wind power installation, and a wind power installation, which make possible simple and cost-effective cooling of the generator while adhering to critical noise emission values, in particular while adhering to critical noise emission values as a function of the operating location of the generator, or of the wind power installation, respectively.

The generator is in particular a generator for a wind power installation. The generator is preferably configured as an external rotor. The generator is in particular an electric generator. The generator has in particular a rotor and a stator, the rotor being mounted so as to be rotatable relative to the stator about a rotation axis. The stator is preferably disposed within the rotor. It may also be preferable for the rotor to be disposed within the stator.

The generator by way of a generator width preferably extends in the axial direction. The axial direction here preferably corresponds to the direction along the rotation axis of the generator. The generator, orthogonal to the axial direction, preferably extends by way of a generator diameter in the radial direction.

The generator has an air supply duct and an exhaust air chamber, in particular two or a plurality of exhaust air chambers, which is/are fluidically connected to the upstream air supply duct. The air supply duct and the exhaust air chamber are in particular disposed within the generator housing, in the generator interior space. The generator preferably has a plurality of air supply ducts and/or a plurality of exhaust air chambers. It can be particularly preferable for one air supply duct in each case to be fluidically connected to one exhaust air chamber. A plurality of air supply ducts are preferably disposed so as to be mutually equidistant in the circumferential direction of the generator. It is furthermore preferable for the exhaust air chambers in the circumferential direction of the generator to be disposed so as to be mutually equidistant.

The air supply duct, for cooling the generator, is in particular configured for supplying ambient air from the environment of the generator as cooling air. Furthermore, the exhaust air chamber, for cooling the generator, is preferably configured for discharging the cooling air "heated" by the generator in the direction of the environment of the generator. The air supply duct enables the cooling air to be supplied in a manner spatially separated from the heated cooling air that is discharged in the exhaust air chamber. It is furthermore preferable for the air supply duct and the exhaust air chamber to be thermally decoupled from one another.

The generator furthermore has a stator having a stator active unit, and a rotor which is disposed so as to be rotatable relative to the stator about a rotation axis and has a rotor active unit. The rotor active unit and stator active unit are disposed so as to be mutually spaced apart by an air gap by way of which the exhaust air chamber is fluidically connected to the upstream air supply duct. The air gap preferably extends substantially in the axial direction across a width, in particular a width of the rotor active unit and the stator active unit. Furthermore, the air gap is preferably configured so as to be annular. In particular, the air gap in the radial direction corresponds to the spacing between the rotor active unit and the stator active unit.

The generator furthermore has an air-conveying device which is disposed downstream of the exhaust air chamber and is configured for cooling the rotor active unit and the stator active unit, the air-conveying device for cooling the rotor active unit and the stator active unit supplying cooling air to the air gap by way of the air supply duct, and discharging from the air gap cooling air heated by the rotor active unit and the stator active unit by way of the exhaust air chamber, the exhaust air chamber being configured for discharging the heated cooling air substantially in a radial direction in terms of the rotation axis.

It is particular preferable for the exhaust air chamber to convey heated cooling air from the rotor active unit and stator active unit, in particular from the air gap, in the radial direction, in the direction of the rotation axis of the generator. It is furthermore preferable for the air supply duct to convey cooling air in the radial direction from the rotation axis of the generator in the direction of the rotor active unit and stator active unit, in particular the air gap.

The generator preferably has a plurality of air-conveying devices. In particular, the air-conveying devices are disposed so as to be mutually equidistant in the circumferential direction. The air-conveying device is a ventilator, for example.

Such a generator enables simple and cost-effective guiding of the cooling air within the generator. Furthermore, the generator in the region of the deflections of the cooling air on the stator active unit and rotor active unit is preferably encapsulated. This has the effect of less noise being emitted.

According to one preferred embodiment of the generator, it is provided that the air supply duct is configured for supplying the cooling air substantially in the radial direction in terms of the rotation axis. The air supply duct preferably has a direction of main extent substantially in the radial direction. It can be furthermore preferable for the generator to have a plurality of air supply ducts. It can be particularly preferable for the plurality of air supply ducts to be disposed so as to be mutually equidistant. It can be furthermore preferable for two or more air supply ducts to be disposed so as to be mutually spaced apart in the axial direction.

In one preferred refinement of the generator, it is provided that the stator and/or the rotor at least in portions forms/form the air supply duct, the air supply duct preferably being configured between: a stator support structure of the stator and a rotor support structure of the rotor, and/or a stator cladding element of the stator and the stator support structure of the stator, and/or a rotor downwind cladding element of the rotor and the stator support structure of the stator, and/or the stator and/or the rotor at least in portions forms/form the exhaust air chamber, the exhaust air chamber preferably being configured within the stator.

According to one further refinement, it is provided that the generator has a generator housing having an internal side and an external side, opposite the internal side. The internal side faces a generator interior space of the generator, and the external side faces an environment of the generator.

The generator housing preferably encloses a generator interior space. The generator housing in spatial terms delimits in particular the generator interior space, which extends within the generator housing, from the environment situated outside the generator housing. The air supply ducts can in particular be configured on the internal side of the generator housing.

In this preferred refinement, it is furthermore provided that the generator can have at least one air outlet duct which extends between the internal side and the external side, the at least one air outlet duct fluidically connecting the exhaust air chamber to the environment. The generator preferably has a plurality of air outlet ducts. In particular, the plurality of air outlet ducts are disposed so as to be equidistant in the circumferential direction of the generator.

The at least one air outlet duct is configured as a through-opening. The at least one air outlet duct can be configured so as to be in the shape of a tube or a hose, for example. Furthermore, the at least one air outlet duct can be configured as a line. To this end, the at least one air outlet duct preferably extends through the generator housing. The at least one air outlet duct preferably extends substantially in the axial direction.

The cooling air can be discharged from the generator in a targeted manner by way of the at least one air outlet duct. In particular, the at least one air outlet duct enables targeted guiding of the cooling air within the generator.

Additionally or alternatively, it can be provided in this preferred refinement that the generator has at least one air inlet duct which extends between the internal side and the external side, the at least one air inlet duct fluidically connecting the generator interior space to the environment. The generator preferably has a plurality of air inlet ducts. In particular, the plurality of air inlet ducts are disposed so as to be equidistant in the circumferential direction of the generator.

The at least one air inlet duct is configured as a through-opening. The at least one air inlet duct can be configured in the shape of a tube or a hose, for example. Furthermore, the at least one air inlet duct can be configured as a line. To this end, the at least one air inlet duct preferably extends through the generator housing. The at least one air inlet duct preferably extends substantially in the axial direction.

The cooling air can be guided in a targeted manner into the generator by way of the at least one air inlet duct. In particular, the at least one air inlet duct enables targeted guiding of the cooling air within the generator.

Air from the environment flows as cooling air through the at least one air inlet duct in particular during the operation of the generator. It may be preferable for a droplet separator to be provided on the at least one air inlet duct so as to separate moisture, in particular water droplets, from the air flowing into the generator. Additionally or alternatively, an air filter which removes particles from the air flowing into the generator can be disposed on the at least one air inlet duct. The air filter can comprise coarse filters and/or fine filters. This particularly advantageously increases the service life of the generator, or of the wind power installation, respectively.

According to one preferred embodiment, the generator has two end sides, the generator interior space of the generator extending therebetween in an axial direction, the at least one air outlet duct being disposed on an end side of the generator segment and/or the at least one air inlet duct being disposed on one of the two end sides of the generator. It is particularly preferable for the generator housing to have the two end sides. It is preferable in particular that one of the two end sides, or both end sides, is or are configured in one part or in multiple parts.

According to one preferred embodiment of the generator, it is furthermore provided that the at least one air outlet duct is disposed on that end side of the generator segment that in the operating state of the generator is the end side that faces away from the wind. In particular in the case of a wind power installation configured as an upwind turbine, the at least one air outlet duct is disposed on that end side of the generator that in the operating state of the generator is the end side that faces away from the rotor blades. Additionally or alternatively, it is provided in this preferred embodiment of the generator that the at least one air inlet duct is disposed on that end side of the generator that in the operating state of the generator is the end side that faces away from the wind. In particular in the case of a wind power installation configured as an upwind turbine, the at least one air inlet duct is disposed on that end side of the generator that in the operating state of the generator is the end side that faces away from the rotor blades. In the case of a wind power installation configured as an upwind turbine, the end side that faces away from the wind in the operating state is preferably the end side of the generator that faces away from the rotor blades.

Alternatively, in the case of a wind power installation configured as a downwind turbine, the at least one air outlet duct and/or the at least one air inlet duct is/are preferably disposed on that end side of the generator that in the operating state of the generator is the end side that faces the rotor blades. In the case of a wind power installation configured as a downwind turbine, the end side that faces away from the wind in the operating state is the end side of the generator that faces the rotor blades.

In one further preferred refinement, it is furthermore provided that the generator, preferably the stator, has a pressurized chamber, the pressurized chamber preferably being disposed between the at least one air outlet duct and the exhaust air chamber, and fluidically connecting the at least one air outlet duct to the exhaust chamber. The pressurized chamber is configured in particular for distributing the heated cooling air to the at least one air outlet duct. In particular in the case of generators having a plurality of air outlet ducts, the pressurized chamber is configured for evenly distributing the heated cooling air to the air outlet ducts.

According to one further preferred embodiment of the generator, the air-conveying device is disposed between the exhaust air chamber and the pressurized chamber, the exhaust air chamber by way of the air-conveying device being fluidically connected to the pressurized chamber, the air-conveying device preferably being disposed within the stator, in particular within the stator support structure, and the air-conveying device particularly preferably comprising a ventilator.

In one preferred refinement, it is furthermore provided that the air supply duct is fluidically connected to the at least one air inlet duct.

According to one further preferred refinement of the generator, at least one silencer is disposed on the generator, the at least one silencer preferably being releasably disposed on the generator.

A disposal of the at least one silencer on the at least one air outlet duct can in particular comprise a disposal within the air outlet duct. It may be preferable for the silencer to extend partially within the air outlet duct. It may be particularly preferable for the silencer to extend completely through the air outlet duct.

The releasable disposal of the at least one silencer on the generator can be implemented by a form-fitting and/or force-fitting and/or materially integral connection. For example, a twist and/or snap-fit connection can be considered as a form-fitting connection. A force-fitting connection can be implemented by a screw connection, for example. An adhesive connection can be provided as a materially integral connection, for example.

The releasable disposal of the at least one silencer on the generator has the advantage that the at least one silencer can be replaced in a particularly simple and rapid manner. This has the particular advantage that the generator, or the wind power installation having such a generator, respectively, can be equipped with silencers in a particularly simple and rapid manner, said silencers meeting the (location-dependent) critical emission values at the location of the operation. In particular, such generators, or the wind power installations, respectively, can be retrofitted with silencers without great complexity, said silencers also being able to meet future emission guidelines having stricter critical values.

According to one further preferred embodiment of the generator, it is provided that the at least one silencer is disposed on the at least one air outlet duct, the at least one silencer preferably extending through the at least one air outlet duct and/or the at least one silencer extending beyond the external side, the at least one silencer having in particular a duct silencer and/or a splitter silencer and/or sound-absorbing elements.

The at least one silencer, which extends beyond the external side, extends in particular into the environment of the generator. It may be furthermore preferable for the at least one silencer to extend beyond the internal side. The at least one silencer, which extends beyond the internal side, extends in particular into the generator interior space of the generator.

This preferred embodiment makes it possible for the at least one silencer, as a function of the critical emission values applicable at the location of the generator, or of the wind power installation, to be "adjusted" in terms of its silencing characteristics. If a comparatively high level of silencing is required, a longer silencer can be provided; however, if a comparatively low level of silencing is sufficient, a shorter silencer can be provided. In particular, such generators and corresponding wind power installations can be retrofitted with corresponding silencers which meet future, stricter critical noise emission values.

According to one preferred refinement, it is furthermore provided that the generator has a shut-off unit, the shut-off unit preferably being variable between an open position and a blocking position different from the open position, the shut-off unit being in particular a louver blade or a duct flap.

Such a shut-off unit can be configured in one part or in multiple parts. It may furthermore be preferable for the shut-off unit to be a mechanically activated shut-off unit and/or a shut-off unit with motorized activation.

The shut-off unit has the effect that environmental influences from the environment, for example rainwater, dust, etc., do not enter the generator interior space in the standby operating state of the generator, or of the wind power installation. To this extent, the shut-off unit has the advantage that the generator, or the wind power installation, is subject to less contamination, and the probability of a failure of the generator, or of the wind power installation, decreases.

This embodiment furthermore has the advantage that servicing and maintenance can take place at longer intervals in comparison to generators without such a shut-off unit. The operating costs of such generators can decrease as a result.

The shut-off unit can in particular be configured such that said shut-off unit is in the open position during the operation of the generator. The shut-off unit can be positioned in the open position by mechanical or motorized activation.

In the case of a mechanically activated shut-off unit, the heated cooling air which flows out of the generator can position the shut-off unit in the open position, for example. In contrast, when the heated cooling air no longer flows from the generator interior space into the environment of the generator, the shut-off unit is positioned in the blocking position. It may furthermore be preferable for the shut-off unit during the operation of the generator to be positioned in the open position by a drive, and for the drive to position the shut-off unit in the blocking position when the generator is no longer being cooled.

This has the advantage that the air resistance caused by the shut-off unit in the open position during operation is minor, and the generator, or the generator interior space, respectively, in the standby operating state is protected from environmental influences by the shut-off unit in the blocking position.

This has the advantage that standard components can be used as a shut-off unit. This has the advantage that shut-off units configured in such a manner are readily available and can thus also be procured at short notice.

According to one further preferred embodiment, it is furthermore provided that the at least one air outlet duct is configured so as to be cylindrical or polygonal. The at least one air outlet duct is configured so as to be cylindrical in particular, when duct silencers are provided as silencers. It is furthermore preferable for the at least one air outlet duct to be configured so as to be polygonal when splitter silencers are provided as silencers.

Moreover, also provided is a wind power installation comprising a generator as described above.

In terms of further advantages, variants of embodiments and details of embodiments of the further aspects and the potential refinements thereof, reference is also made to the previous description pertaining to the corresponding features and refinements of the generator.

Wind power installations emit noise during operation. The reason therefor is, for example, wind turbulences on the rotor blades of the wind power installations. Apparatuses within wind power installations also represent potential sources of noise during operation. A substantial source of noise is, for example, cooling devices which generate an air flow for cooling an (electric) generator of wind power installations, for instance. Turbulences which emit noise are also typically created as a result of the air flow being conveyed and deflected within the generator, in particular through narrow gaps and the like.

Humans and animals perceive noise in a specific frequency range as sound at a specific volume. The volume is characterized by the sound pressure level. Owing to statutory provisions, in order to protect humans and animals, wind power installations must not exceed a specific volume (critical value) during operation. The permissible critical value which must not be exceeded by a wind power installation usually depends on the location where the wind power installation is operated. For example, the critical value is typically lower in the proximity of built-up areas than away from the latter.

In order for the efficiency of wind power installations to be improved, the height of the hub and the diameter of the aerodynamic rotor of wind power installations are constantly increasing. However, the propagation of noise, and to this extent also the exposure to noise increases in the case of comparatively large wind power installations. Furthermore, the emission of noise of wind power installations can also increase as the size of the latter increases. A cause therefor can lie in the higher requirement in terms of cooling output for cooling the generator, because larger cooling devices, or more cooling devices, for example ventilators, which can provide an air flow having the required cooling output, may be required. The globally increasing average temperature is increasing the requirement for additional cooling output.

Provided is a generator, in particular a generator for a wind power installation, and a wind power installation, which minimize or eliminate one or a plurality of the mentioned disadvantages of existing solutions.

According to a first aspect of this furthermore preferred invention, provided is a generator, in particular a generator for a wind power installation, the generator having: a generator housing having: an internal side which faces a generator interior space of the generator, and an external side, opposite the internal side, which faces an environment of the generator; at least one air outlet duct which extends between the internal side and the external side, the at least one air outlet duct fluidically connecting the generator interior space to the environment, wherein at least one silencer is disposed on the generator.

The generator is in particular a generator for a wind power installation. The generator is preferably configured as an external rotor. The generator is in particular an electric generator. The generator has in particular a rotor and a stator, the rotor being mounted so as to be rotatable relative to the stator about a rotation axis. The stator is preferably disposed within the rotor. It may also be preferable for the rotor to be disposed within the stator.

The generator by way of a generator width preferably extends in the axial direction. The axial direction here preferably corresponds to the direction along the rotation axis of the generator. The generator, orthogonal to the axial direction, preferably extends by way of a generator diameter in the radial direction.

The generator has a generator housing having an internal side and an external side opposite the internal side. The internal side faces a generator interior space of the generator. The external side faces an environment of the generator. In particular, the generator housing in spatial terms delimits the generator interior space, which extends within the generator housing, from the environment situated outside the generator housing.

The generator furthermore has at least one air outlet duct. The air outlet duct extends between the internal side and the external side. The at least one air outlet duct here fluidically connects the generator interior space to the environment. The generator preferably has a plurality of air outlet ducts. In particular, the plurality of air outlet ducts are disposed so as to be equidistant in the circumferential direction of the generator.

The at least one air outlet duct is configured as a through-opening. The at least one air outlet duct can be configured in the shape of a tube or a hose, for example. Furthermore, the at least one air outlet duct can be configured as a line. To this end, the at least one air outlet duct preferably extends through the generator housing. The at least one air outlet duct preferably extends substantially in the axial direction.

The cooling air can be discharged from the generator in a targeted manner by way of the at least one air outlet duct. In particular, the at least one air outlet duct enables targeted guiding of the cooling air within the generator.

The generator furthermore has at least one silencer which is disposed on the generator. The at least one silencer preferably has a direction of main extent in the axial direction.

By using silencers on the generator, the noise emission of such a generator, and to this extent also of a wind power installation having such a generator, can be significantly minimized. The silencers have in particular the effect that the noise is reduced while maintaining the output of the generator or of the wind power installation, respectively. Furthermore, the silencers preferably have the effect that the noise emission remains at least constant as the output of the generator or of the wind power installation, respectively, increases. This advantageously makes possible the operation of generators, or of wind power installations having such generators, respectively, with a higher output without increasing the distance from built-up areas. Furthermore, generators, or wind power installations having such generators, can preferably be operated at a smaller distance from built-up areas in comparison to conventional generators.

(The increasingly more restrictive) emission guidelines can be adhered to using the generator, or using wind power installations having such generators, respectively. In particular, the generators or wind power installations, respectively, can be provided with silencers which meet the location-dependent critical emission values.

The generator, or the wind power installation having such a generator, respectively, has in particular the advantage that the generator, or the wind power installation, does not have to be run in a reduced operating mode in order to adhere to critical emission values, as can often be the case with conventional generators, or wind power installations having conventional generators, respectively.

In one preferred refinement of the generator, it is provided that the at least one silencer is releasably disposed on the generator.

The releasable disposal of the at least one silencer on the generator can be implemented by a form-fitting and/or force-fitting and/or materially integral connection. For example, a twist and/or snap-fit connection can be considered as a form-fitting connection. A force-fitting connection can be implemented by a screw connection, for example. An adhesive connection can be provided as a materially integral connection, for example.

The releasable disposal of the at least one silencer on the generator has the advantage that the at least one silencer can be replaced in a particularly simple and rapid manner. This has the particular advantage that the generator, or the wind power installation having such a generator, respectively, can be equipped with silencers in a particularly simple and rapid manner, said silencers meeting the (location-dependent) critical emission values at the location of the operation. In particular, such generators, or the wind power installations, respectively, can be retrofitted with silencers without great complexity, said silencers also being able to meet future emission guidelines having stricter critical values.

According to one further refinement of the generator, the at least one silencer is disposed on the at least one air outlet duct. A disposal of the at least one silencer on the at least one air outlet duct can in particular comprise a disposal within the air outlet duct. It may be preferable for the silencer to extend partially within the air outlet duct. It can be particularly preferable for the silencer to extend completely through the air outlet duct.

This disposal enables particularly space-saving and efficient damping of the emitted noise. This embodiment makes possible in particular the use of standardized silencers. Particularly cost-effective solutions can be implemented as a result.

According to one preferred embodiment of the generator, the at least one silencer extends through the at least one air outlet duct, the at least one silencer preferably extending beyond the external side.

The at least one silencer which extends beyond the external side extends in particular into the environment of the generator. It may furthermore be preferable for the at least one silencer to extend beyond the internal side. The at least one silencer which extends beyond the internal side extends in particular into the generator interior space of the generator.

This preferred embodiment makes it possible for the at least one silencer, as a function of the critical emission values applicable at the location of the generator, or of the wind power installation, to be “adjusted” in terms of its silencing characteristics. If a comparatively high level of silencing is required, a longer silencer can be provided; however, if a comparatively low level of silencing is sufficient, a shorter silencer can be provided. In particular, such generators and corresponding wind power installations can be retrofitted with corresponding silencers which meet future, stricter critical noise emission values.

According to one preferred embodiment of the generator, the at least one silencer furthermore has a duct silencer and/or a splitter silencer and/or sound-absorbing elements.

The use of silencers configured in such a manner is particularly cost-effective because said silencers can be based on standard components. This furthermore has the advantage that silencers configured in such a manner are readily available and can thus be procured at short notice. It can be prevented as a result that generators or wind power installations, respectively, have to be switched off or put under reduced operation for a comparatively long time in order for the critical noise emission values to be adhered to.

In one further preferred refinement, the generator furthermore has a shut-off unit. Such a shut-off unit can be configured in one part or in multiple parts. It may furthermore be preferable for the shut-off unit to be a mechanically activated shut-off unit and/or a shut-off unit with motorized activation.

The shut-off unit has the effect that environmental influences from the environment, for example rainwater, dust, etc., do not enter the generator interior space in the standby operating state of the generator, or of the wind power installation. To this extent, the shut-off unit has the advantage that the generator, or the wind power installation, is subject to less contamination, and the probability of a failure of the generator, or of the wind power installation, decreases. This embodiment furthermore has the advantage that servicing and maintenance can take place at longer intervals in comparison to generators without such a shut-off unit. The operating costs of such generators can decrease as a result.

According to one further preferred embodiment of the generator, the shut-off unit is variable between an open position and a blocking position different from the open position. The shut-off unit can in particular be configured such that said shut-off unit is in the open position during the operation of the generator. The shut-off unit can be positioned in the open position by mechanical or motorized activation.

In the case of a mechanically activated shut-off unit, the heated cooling air which flows out of the generator can position the shut-off unit in the open position, for example. In contrast, when the heated cooling air no longer flows from the generator interior space into the environment of the generator, the shut-off unit is positioned in the blocking position. It may furthermore be preferable for the shut-off unit during the operation of the generator to be positioned in the open position by a drive, and for the drive to position the shut-off unit in the blocking position when the generator is no longer being cooled.

This has the advantage that the air resistance caused by the shut-off unit in the open position during operation is minor, and the generator, or the generator interior space, respectively, in the standby operating state is protected from environmental influences by the shut-off unit in the blocking position.

In one preferred refinement of the generator, it is furthermore provided that the shut-off unit is a louver blade or a duct flap. This has the advantage that standard components can be used as a shut-off unit. This has the advantage that shut-off units configured in such a manner are readily available and can thus also be procured at short notice.

According to one further preferred embodiment of the generator, the at least one air outlet duct is configured so as to be cylindrical or polygonal. The at least one air outlet duct is configured so as to be cylindrical, in particular when duct silencers are provided as silencers. It is furthermore preferable for the at least one air outlet duct to be configured so as to be polygonal when splitter silencers are provided as silencers.

In one preferred refinement, the generator furthermore has a pressurized chamber which is fluidically connected to the at least one air outlet duct. The pressurized chamber is preferably configured so as to be annular. The pressurized chamber is configured in particular for distributing the heated cooling air to the at least one air outlet duct. In particular in the case of generators having a plurality of air outlet ducts, the pressurized chamber is configured for evenly distributing the heated cooling air to the air outlet ducts.

According to one further preferred refinement of the generator, the generator has at least one air-conveying device which is fluidically connected to the at least one air outlet duct, the at least one air-conveying device preferably being fluidically connected to the at least one air outlet duct by way of the pressurized chamber. The generator has in particular a plurality of air-conveying devices. A plurality of air-conveying devices are preferably disposed so as to be mutually equidistant in the circumferential direction of the generator.

According to one furthermore preferred embodiment, the generator can have at least one air inlet duct which extends between the internal side and the external side, the at least one air inlet duct fluidically connecting the generator interior space to the environment. The generator preferably has a plurality of air inlet ducts. In particular, the plurality of air inlet ducts are disposed so as to be equidistant in the circumferential direction of the generator.

The at least one air inlet duct is configured as a through-opening. The at least one air inlet duct can be configured in the shape of a tube or a hose, for example. Furthermore, the at least one air inlet duct can be configured as a line. To this end, the at least one air inlet duct preferably extends through the generator housing. The at least one air outlet duct preferably extends substantially in the axial direction.

The cooling air can be guided in a targeted manner into the generator by way of the at least one air inlet duct. In particular, the at least one air inlet duct enables targeted guiding of the cooling air within the generator.

Air from the environment flows as cooling air through the at least one air inlet duct in particular during the operation of the generator. It may be preferable for a droplet separator to be provided on the at least one air inlet duct so as to separate moisture, in particular water droplets, from the air flowing into the generator. Additionally or alternatively, an air filter which removes particles from the air flowing into the generator can be disposed on the at least one air inlet duct. The air filter can comprise coarse filters and/or fine filters. This particularly advantageously increases the service life of the generator, or of the wind power installation, respectively.

According to one preferred refinement of the generator, it is furthermore provided that the generator has two end sides, the generator interior space of the generator extending therebetween in the axial direction. The at least one air outlet duct is disposed on one of the two end sides of the generator. Additionally or alternatively, the at least one air inlet duct is disposed on one of the two end sides of the generator. In the case of a wind power installation configured as an upwind turbine, the at least one air outlet duct is preferably disposed on that end side of the generator that in the operating state of the generator is the end side that faces away from the rotor blades. In particular, the at least one air outlet duct is disposed on that end side of the generator that in the operating state of the generator is the end side that faces away from the wind. In the case of a wind power installation configured as an upwind turbine, it can furthermore be preferable for the at least one air inlet duct to be disposed on that end side of the generator that in an operating state of the generator is the end side that faces away from the rotor blades. In particular, the at least one air inlet duct is disposed on that end side of the generator that in the operating state of the generator is the end side that faces away from the wind. In the case of a wind power installation configured as an upwind turbine, the end side that in the operating state faces away from the wind is preferably the end side of the generator that faces away from the rotor blades.

Alternatively, in the case of a wind power installation configured as a downwind turbine, the at least one air outlet duct and/or the at least one air inlet duct are/is preferably disposed on that end side of the generator that in the operating state of the generator is the end side that faces the rotor blades. In the case of a wind power installation configured as a downwind turbine, the end side that in the operating state faces away from the wind is preferably that end side of the generator that faces the rotor blades.

It is particularly preferable for the generator housing to have the two end sides. It is particularly preferable for one of the two end sides, or both end sides, to be configured in one part or in multiple parts.

This has the advantage that the generator in the direction of the wind does not have any openings through which water or dirt is introduced. Rather, both the at least one air outlet duct and the at least one air inlet duct lie on the downwind side of the generator housing so as to be protected from wind.

According to one further preferred embodiment of the generator, it is furthermore provided that the generator has: an air inlet duct and an exhaust air chamber, in particular two or a plurality of exhaust air chambers, which is/are fluidically connected to the upstream air supply duct, a rotor having a rotor active unit, and a stator having a stator active unit, the rotor active unit and the stator active unit being disposed so as to be mutually spaced apart by an air gap by way of which the exhaust air chamber is fluidically connected to the upstream air supply duct; the air-conveying device preferably being disposed downstream of the exhaust air chamber that is configured for cooling the rotor active unit and the stator active unit, the air-conveying device for cooling the rotor active unit and the stator active unit supplying cooling air to the air gap by way of the air supply duct, and discharging from the air gap cooling air heated by the rotor active unit and the stator active unit by way of the exhaust air chamber, the air supply duct being in particular fluidically connected to the at least one air inlet duct.

Moreover, the object mentioned at the outset is achieved by a wind power installation comprising a generator as described above.

In terms of further advantages, variants of embodiment and details of embodiments of the further aspects and the potential refinements thereof, reference is made to the description above pertaining to the corresponding features and refinements of the generator.

This preferred invention having the preferred embodiments is defined in particular by the subject matter of the following embodiments:

1. A generator, in particular a generator for a wind power installation, the generator having:
   a generator housing having:
   an internal side which faces a generator interior space of the generator, and
   an external side, opposite the internal side, which faces an environment (E) of the generator,
   at least one air outlet duct which extends between the internal side and the external side, the at least one air outlet duct fluidically connecting the generator interior space to the environment (E),
   wherein
   at least one silencer is disposed on the generator.
2. The generator as per the preceding embodiment 1, wherein
   the at least one silencer is releasably disposed on the generator.
3. The generator as per either of the preceding embodiments 1 and 2, wherein
   the at least one silencer is disposed on the at least one air outlet duct.
4. The generator as per one of the preceding embodiments 1 to 3, wherein the at least one silencer extends through the at least one air outlet duct,
   the at least one silencer preferably extending beyond the external side.
5. The generator as per one of the preceding embodiments 1 to 4, wherein
   the at least one silencer has a duct silencer and/or a splitter silencer and/or sound-absorbing elements.
6. The generator as per one of the preceding embodiments 1 to 5, having a shut-off unit.
7. The generator as per the preceding embodiment 6, wherein the shut-off unit is variable between an open position and a blocking position different from the open position.
8. The generator as per either of the preceding embodiments 6 and 7, wherein
   the shut-off unit is a louver blade or a duct flap.
9. The generator as per one of the preceding embodiments 1 to 8, wherein
   the at least one air outlet duct is configured so as to be cylindrical or polygonal.
10. The generator as per one of the preceding embodiments 1 to 9, having a pressurized chamber which is fluidically connected to the at least one air outlet duct.
11. The generator as per one of the preceding embodiments 1 to 10, having
   at least one air-conveying device which is fluidically connected to the at least one air outlet duct,
   the at least one air-conveying device preferably being fluidically connected to the at least one air outlet duct by way of the pressurized chamber.
12. The generator as per one of the preceding embodiments 1 to 11, having
   at least one air inlet duct which extends between the internal side and the external side, the at least one air inlet duct fluidically connecting the generator interior space to the environment (E).
13. The generator as per one of the preceding embodiments 1 to 12, having
   two end sides, the generator interior space of the generator extending therebetween in an axial direction (A),
   the at least one air outlet duct being disposed on one of the two end sides of the generator,
   the at least one air outlet duct preferably being disposed on that end side of the generator that in the operating state of the generator is the end side that faces away from the wind (W),
   and/or
   the at least one air inlet duct is disposed on one of the two end sides of the generator,
   the at least one air inlet duct being in particular disposed on that end side of the generator that in an operating state of the generator is the end side that faces away from the wind (W)
14. The generator as per one of the preceding embodiments 1 to 13, having
   an air supply duct and an exhaust air chamber, in particular two or a plurality of exhaust air chambers, which is/are fluidically connected to the upstream air supply duct,
   a rotor having a rotor active unit and a stator having a stator active unit,
   the rotor active unit and the stator active unit being disposed so as to be mutually spaced apart by an air gap (S) by way of which the exhaust air chamber is fluidically connected to the upstream air supply duct,
   the air-conveying device preferably being disposed downstream of the air exhaust chamber that is configured for cooling the rotor active unit and the stator active unit, the air-conveying device for cooling the rotor active unit and the stator active unit
   supplying cooling air (C) to the air gap (S) by way of the air supply duct, and
   discharging from the air gap cooling air (H) heated by the rotor active unit and the stator active unit by way of the exhaust air chamber,
   the air supply duct being in particular fluidically connected to the at least one air inlet duct.
15. A wind power installation, having a generator as per one of the preceding embodiments 1 to 14.

An invention which relates to a generator, in particular to a generator for a wind power installation, and to a wind power installation, can be provided in a furthermore preferred way.

Wind power installations emit noise during operation. The reason therefor is, for example, wind turbulences on the rotor blades of the wind power installations. Apparatuses within wind power installations also represent potential sources of noise during operation. A substantial source of noise is, for example, cooling devices which generate an air flow for cooling an (electric) generator of wind power installations, for instance. Turbulences which emit noise are also typically created as a result of the air flow being conveyed and deflected within the generator, in particular through narrow gaps and the like.

Humans and animals perceive noise in a specific frequency range as sound at a specific volume. The volume is characterized by the sound pressure level. Owing to statutory provisions, in order to protect humans and animals, wind power installations must not exceed a specific volume (critical value) during operation. The permissible critical value which must not be exceeded by a wind power installation usually depends on the location where the wind power installation is operated. For example, the critical value is typically lower in the proximity of built-up areas than away from the latter.

In order for the efficiency of wind power installations to be improved, the height of the hub and the diameter of the aerodynamic rotor of wind power installations are constantly increasing. However, the propagation of noise, and to this extent also the exposure to noise increases in the case of comparatively large wind power installations. Furthermore, the emission of noise of wind power installations can also increase as the size of the latter increases. A cause therefor can lie in the higher requirement in terms of cooling output for cooling the generator, because larger cooling devices, or more cooling devices, for example ventilators, which can provide an air flow having the required cooling output, may be required. The globally increasing average temperature is increasing the requirement for additional cooling output.

For cooling generators, it is known for the heated cooling air, which is to be discharged in order for the generator to be cooled, to be discharged from the generator in the radial direction by way of an annular gap on the external circumferential face. It is furthermore known, for supplying cooling air to a generator in the axial direction, for said cooling air to be guided in the axial direction through a rotor active unit and a stator active unit of a generator, and to be subsequently guided in the axial direction out of the generator. This is known from US 2007/0222223 A1, for example.

These known solutions have the advantage that they are comparatively space-saving and guide the cooling air within the generator by way of few/no deflections, i.e., with low resistance and comparatively low noise emission. Furthermore, a correspondingly open construction mode of the generator can avoid a requirement in terms of additional cooling systems.

However, this construction mode does not permit adequate damping of the generated noise. In particular, the noise emission of these generators cannot be adapted as a function of the critical noise emission values that apply at the operating location of the generator. A further negative effect in the case of the known solutions is that water and dirt can relatively easily enter the generator interior space. Consequently, servicing and maintenance work on these generators may be required at short intervals. There is thus the risk of the operation of such generators potentially becoming comparatively expensive.

It is, therefore, an object to provide a generator, in particular a generator for a wind power installation, and a wind power installation, which make possible simple and cost-effective cooling of the generator while adhering to critical noise emission values, in particular while adhering to critical noise emission values as a function of the operating location of the generator, or of the wind power installation, respectively.

According to a first aspect of this furthermore preferred invention, this object is achieved by a generator, in particular a generator for a wind power installation, the generator having: two end sides, a generator interior space of the generator extending therebetween in an axial direction; the two end sides having: an internal side which faces a generator interior space of the generator, and an external side, opposite the internal side, which faces an environment of the generator, at least one air outlet duct and at least one air inlet duct which extend between the internal side and the external side and in each case fluidically connect the generator interior space to the environment, wherein the at least one air outlet duct and the at least one air inlet duct are disposed on the same end side of the generator.

The generator is in particular a generator for a wind power installation. The generator is preferably configured as an external rotor. The generator is in particular an electric generator. In particular, the generator has a rotor and a stator, the rotor being mounted so as to be rotatable relative to the stator about a rotation axis. The stator is preferably disposed within the rotor. It may also be preferable for the rotor to be disposed within the stator.

The generator by way of a generator width preferably extends in the axial direction. The axial direction here preferably corresponds to the direction along the rotation axis of the generator. The generator, orthogonal to the axial direction, preferably extends by way of a generator diameter in the radial direction.

The generator has in particular a generator housing having an internal side and an external side opposite the internal side. The internal side faces a generator interior space of the generator. The external side faces an environment of the generator. The generator housing in spatial terms delimits in particular the generator interior space, which extends within the generator housing, from the environment situated outside the generator housing.

The generator has two end sides, the generator interior space of the generator extending therebetween in an axial direction. The two end sides have an internal side and an external side opposite the internal side. The internal side faces the generator interior space of the generator. The external side faces an environment of the generator. It is particularly preferable for the generator housing to have the two end sides. It is particularly preferable for one of the two end sides, or both end sides, to be configured in one part or in multiple parts.

The generator furthermore has at least one air outlet duct and at least one air inlet duct.

The at least one air outlet duct extends between the internal side and the external side and fluidically connects the generator interior space to the environment. The generator preferably has a plurality of air outlet ducts. In particular, the plurality of air outlet ducts are disposed so as to be equidistant in the circumferential direction of the generator.

The at least one air outlet duct is configured as a through-opening. The at least one air outlet duct can be configured so as to be in the shape of a tube or a hose, for example. Furthermore, the at least one air outlet duct can be configured as a line. To this end, the at least one air outlet duct preferably extends through the generator housing. The at least one air outlet duct preferably extends substantially in the axial direction.

The cooling air can be discharged from the generator in a targeted manner by way of the at least one air outlet duct. In particular, the at least one air outlet duct enables targeted guiding of the cooling air within the generator.

The at least one air inlet duct extends between the internal side and the external side and fluidically connects the generator interior space to the environment. The generator preferably has a plurality of air inlet ducts. In particular, the plurality of air inlet ducts are disposed so as to be equidistant in the circumferential direction of the generator.

The at least one air inlet duct is configured as a through-opening. The at least one air inlet duct can be configured in the shape of a tube or a hose, for example. Furthermore, the at least one air inlet duct can be configured as a line. To this end, the at least one air inlet duct preferably extends through the generator housing The cooling air can be guided in a targeted manner into the generator by way of the at least one air inlet duct. In particular, the at least one air inlet duct enables targeted guiding of the cooling air within the generator.

Air from the environment flows as cooling air through the at least one air inlet duct in particular during the operation of the generator. It may be preferable for a droplet separator to be provided on the at least one air inlet duct so as to separate moisture, in particular water droplets, from the air flowing into the generator. Additionally or alternatively, an air filter which removes particles from the air flowing into the generator can be disposed on the at least one air inlet duct. The air filter can comprise coarse filters and/or fine filters. This particularly advantageously increases the service life of the generator, or of the wind power installation, respectively.

The at least one air outlet duct and the at least one air inlet duct are disposed on the same end side of the generator.

Such a generator enables simple and cost-effective guiding of the cooling air within the generator. Furthermore, the generator in the region of the deflections of the cooling air on the stator active unit and rotor active unit is preferably encapsulated. This has the effect of less noise being emitted.

In one preferred refinement of the generator, it is furthermore provided that the at least one air outlet duct and the at least one air inlet duct are disposed on that end side of the generator that in an operating state of the generator is the end side that faces away from the wind. In particular in the case of a wind power installation configured as an upwind turbine, the at least one air outlet duct and the at least one air inlet duct are disposed on that end side of the generator that in the operating state of the generator is the end side that faces away from the rotor blades. In the case of a wind power installation configured as an upwind turbine, the end side that faces away from the wind in the operating state is preferably the end side of the generator that faces away from the rotor blades.

Alternatively, in the case of a wind power installation configured as a downwind turbine, the at least one air outlet duct and/or the at least one air inlet duct is/are preferably disposed on that end side of the generator that in the operating state of the generator is the end side that faces the rotor blades. In the case of a wind power installation configured as a downwind turbine, the end side that faces away from the wind in the operating state is preferably the end side of the generator that faces the rotor blades.

This preferred embodiment has the advantage that less water and dust from the wind can enter the generator interior space by way of the at least one air outlet duct and the at least one air inlet duct. This has the advantage that servicing and maintenance can take place at longer intervals in comparison to generators without such a disposal of the at least one air outlet duct and the at least one air inlet duct. The operating costs of such generators can decrease as a result.

According to one further refinement of the generator, the at least one air outlet duct has a cylindrical or a polygonal cross section.

According to one preferred embodiment of the generator, it is provided that the at least one air outlet duct is disposed on one orbit or on a plurality of mutually dissimilar orbits which is/are aligned so as to be coaxial with a rotation axis of the generator.

According to one preferred embodiment of the generator, it is furthermore provided that the at least one air outlet duct extends substantially in an axial direction.

The generator in a further preferred refinement furthermore has a pressurized chamber which is fluidically connected to one air outlet duct or a plurality of air outlet ducts.

The pressurized chamber is preferably disposed between the at least one air outlet duct and an exhaust air chamber, and fluidically connects the at least one air outlet duct to the exhaust air chamber. The pressurized chamber is in particular configured for distributing the heated cooling air to the at least one air outlet duct. In particular in the case of generators having a plurality of air outlet ducts, the pressurized chamber is configured for evenly distributing the heated cooling air to the air outlet ducts.

According to one further preferred embodiment of the generator, a silencer is disposed on the generator. The silencer is preferably releasably disposed on the generator.

A disposal of the at least one silencer on the at least one air outlet duct can in particular comprise a disposal within the air outlet duct. It may be preferable for the silencer to extend partially within the air outlet duct. It may be particularly preferable for the silencer to extend completely through the air outlet duct.

The releasable disposal of the at least one silencer on the generator can be implemented by a form-fitting and/or force-fitting and/or materially integral connection. For example, a twist and/or snap-fit connection can be considered as a form-fitting connection. A force-fitting connection can be implemented by a screw connection, for example. An adhesive connection can be provided as a materially integral connection, for example.

The releasable disposal of the at least one silencer on the generator has the advantage that the at least one silencer can be replaced in a particularly simple and rapid manner. This has the particular advantage that the generator, or the wind power installation having such a generator, respectively, can be equipped with silencers in a particularly simple and rapid manner, said silencers meeting the (location-dependent) critical emission values at the location of the operation. In particular, such generators, or the wind power installations, respectively, can be retrofitted with silencers without great complexity, said silencers also being able to meet future emission guidelines having stricter critical values.

In one preferred refinement of the generator, it is furthermore provided that the silencer is disposed on the at least one air outlet duct. A disposal of the at least one silencer on the at least one air outlet duct can in particular comprise a disposal within the air outlet duct. It may be preferable for the silencer to extend partially within the air outlet duct. It may be particularly preferable for the silencer to extend completely through the air outlet duct.

This disposal enables particularly space-saving and efficient damping of the emitted noise. This embodiment makes possible in particular the use of standardized silencers. Particularly cost-effective solutions can be implemented as a result.

According to one further preferred embodiment of the generator, it is provided that the at least one silencer extends through the at least one air outlet duct and/or that the at least one silencer extends beyond the external side.

The at least one silencer which extends beyond the external side extends in particular into the environment of the generator. It may furthermore be preferable for the at least one silencer to extend beyond the internal side. The at least one silencer which extends beyond the internal side extends in particular into the generator interior space of the generator.

This preferred embodiment makes it possible for the at least one silencer, as a function of the critical emission values applicable at the location of the generator, or of the wind power installation, to be "adjusted" in terms of its silencing characteristics. If a comparatively high level of silencing is required, a longer silencer can be provided; however, if a comparatively low level of silencing is sufficient, a shorter silencer can be provided. In particular, such generators and corresponding wind power installations can be retrofitted with corresponding silencers which meet future, stricter critical noise emission values.

According to one preferred refinement of the generator, it is furthermore provided that the at least one silencer furthermore has a duct silencer and/or a splitter silencer and/or sound-absorbing elements.

The at least one air outlet duct is configured so as to be cylindrical, in particular when duct silencers are provided as silencers. It is furthermore preferable for the at least one air outlet duct to be configured so as to be polygonal when splitter silencers are provided as silencers.

The use of silencers configured in such a manner is particularly cost-effective because said silencers can be based on standard components. This furthermore has the advantage that silencers configured in such a manner are readily available and can thus be procured at short notice. It can be prevented as a result that generators or wind power installations, respectively, have to be switched off or put under reduced operation for a comparatively long time in order for the critical noise emission values to be adhered to.

In one further preferred refinement, the generator furthermore has a shut-off unit. Such a shut-off unit can be configured in one part or in multiple parts. It may furthermore be preferable for the shut-off unit to be a mechanically activated shut-off unit and/or a shut-off unit with motorized activation.

The shut-off unit has the effect that environmental influences from the environment, for example rainwater, dust, etc., do not enter the generator interior space in the standby operating state of the generator, or of the wind power installation. To this extent, the shut-off unit has the advantage that the generator, or the wind power installation, is subject to less contamination, and the probability of a failure of the generator, or of the wind power installation, decreases. This embodiment furthermore has the advantage that servicing and maintenance can take place at longer intervals in comparison to generators without such a shut-off unit. The operating costs of such generators can decrease as a result.

The shut-off unit is preferably variable between an open position and a blocking position different from the open position. The shut-off unit can in particular be configured such that said shut-off unit is in the open position during the operation of the generator. The shut-off unit can be positioned in the open position by mechanical or motorized activation.

In the case of a mechanically activated shut-off unit, the heated cooling air which flows out of the generator can position the shut-off unit in the open position, for example. In contrast, when the heated cooling air no longer flows from the generator interior space into the environment of the generator, the shut-off unit is positioned in the blocking position. It may furthermore be preferable for the shut-off unit during the operation of the generator to be positioned in the open position by a drive, and for the drive to position the shut-off unit in the blocking position when the generator is no longer being cooled.

This has the advantage that the air resistance caused by the shut-off unit in the open position during operation is minor, and the generator, or the generator interior space, respectively, in the standby operating state is protected from environmental influences by the shut-off unit in the blocking position.

The shut-off unit is particularly preferably a louver blade or a duct flap. This has the advantage that standard components can be used as a shut-off unit. This has the advantage that shut-off units configured in such a manner are readily available and can thus also be procured at short notice.

According to a furthermore preferred embodiment, the generator has an air supply duct and an exhaust air chamber. The exhaust air chamber is fluidically connected to the upstream air supply duct.

The air supply duct and the exhaust air chamber are in particular disposed within the generator housing, in the generator interior space. The generator preferably has a plurality of air supply ducts and/or a plurality of exhaust air chambers. It can be particularly preferable for one air supply duct in each case to be fluidically connected to one exhaust air chamber. A plurality of air supply ducts are preferably disposed so as to be mutually equidistant in the circumferential direction of the generator. It is furthermore preferable for the exhaust air chambers in the circumferential direction of the generator to be disposed so as to be mutually equidistant.

The air supply duct, for cooling the generator, is in particular configured for supplying ambient air from the environment of the generator as cooling air. Furthermore, the exhaust air chamber, for cooling the generator, is preferably configured for discharging the cooling air "heated" by the generator in the direction of the environment of the generator. The air supply duct enables the cooling air to be supplied in a manner spatially separated from the heated cooling air that is discharged in the exhaust air chamber. It is furthermore preferable for the air supply duct and the exhaust air chamber to be thermally decoupled from one another.

The generator furthermore has in particular a stator having a stator active unit, and a rotor which is disposed so as to be rotatable relative to the stator about a rotation axis and has a rotor active unit. The rotor active unit and the stator active unit are disposed so as to be mutually spaced apart by an air gap by way of which the exhaust air chamber is fluidically connected to the upstream air supply duct. The air gap preferably extends substantially in the axial direction across a width, in particular a width of the rotor active unit and stator active unit. Furthermore, the air gap is preferably configured so as to be annular. In particular, the air gap in the radial direction corresponds to the spacing between the rotor active unit and stator active unit.

It is particularly preferable for the exhaust air chamber to convey heated cooling air from the rotor active unit and stator active unit, in particular from the air gap, in the radial direction, in the direction of the rotation axis of the generator. It is furthermore preferable for the air supply duct to convey cooling air in the radial direction from the rotation axis of the generator in the direction of the rotor active unit and stator active unit, in particular the air gap.

An air-conveying device is preferably disposed downstream of the exhaust air chamber. The air-conveying device is configured for cooling the rotor active unit and the stator active unit. The air-conveying device, for cooling the rotor active unit and the stator active unit, supplies cooling air to the air gap by way of the air supply duct, and discharges from the air gap cooling air heated by the rotor active unit and the stator active unit by way of the exhaust air chamber. The air supply duct is in particular fluidically connected to the at least one air inlet duct. The exhaust air chamber is in particular configured for discharging the heated cooling air substantially in a radial direction in terms of the rotation axis.

Moreover, the object mentioned at the outset is achieved by a wind power installation comprising a generator as described above.

In terms of further advantages, variants of embodiment and details of embodiments of the further aspects and the potential refinements thereof, reference is also made to the previous description pertaining to the corresponding features and refinements of the generator.

This preferred invention having the preferred embodiments is defined in particular by the subject matter of following embodiments:

1. A generator, in particular a generator for a wind power installation, the generator having:
   two end sides, a generator interior space of the generator extending therebetween in an axial direction (A); the two end sides having:
      an internal side which faces a generator interior space of the generator, and
      an external side, opposite the internal side, which faces an environment (E) of the generator,
   at least one air outlet duct and at least one air inlet duct which extend between the internal side and the external side and in each case fluidically connect the generator interior space to the environment (E), wherein
   the at least one air outlet duct and the at least one air inlet duct are disposed on the same end side of the generator.

2. The generator as per the preceding embodiment 1, wherein the at least one air outlet duct and the at least one air inlet duct are disposed on that end side of the generator that in an operating state of the generator is the end side that faces away from the wind (W).

3. The generator as per either of the preceding embodiments 1 and 2, wherein
   the at least one air outlet duct has a cylindrical or a polygonal cross section.
4. The generator as per one of the preceding embodiments 1 to 3, wherein
   the at least one air outlet duct is disposed on an orbit, or on a plurality of mutually dissimilar orbits, which is/are aligned so as to be coaxial with a rotation axis (D) of the generator.
5. The generator as per one of the preceding embodiments 1 to 4, wherein
   the at least one air outlet duct extends substantially in an axial direction (A).
6. The generator as per one of the preceding embodiments 1 to 5, having
   a pressurized chamber which is fluidically connected to one air outlet duct or a plurality of air outlet ducts.
7. The generator as per one of the preceding embodiments 1 to 6, wherein
   a silencer is disposed on the generator,
   the silencer preferably being releasably disposed on the generator.
8. The generator as per the preceding embodiment 7, wherein
   the silencer is disposed on the at least one air outlet duct.
9. The generator as per one of the preceding embodiments 1 to 8, wherein
   the at least one silencer extends through the at least one air outlet duct and/or the at least one silencer extends beyond the external side.
10. The generator as per one of the preceding embodiments 1 to 9, wherein
   the at least one silencer has a duct silencer and/or a splitter silencer and/or sound-absorbing elements.
11. The generator as per one of the preceding embodiments 1 to 10, having a shut-off unit, the shut-off unit preferably being variable between an open position and a blocking position different from the open position, the shut-off unit particularly preferably being a louver blade or a duct flap.

12. The generator as per one of the preceding embodiments 1 to 11, having:
   an air supply duct and an exhaust air chamber which is fluidically connected to the upstream air supply duct,
   a rotor having a rotor active unit and a stator having a stator active unit,
   the rotor active unit and the stator active unit being disposed so as to be mutually spaced apart by an air gap (S) by way of which the exhaust air chamber is fluidically connected to the upstream air supply duct,
   an air-conveying device being preferably disposed downstream of the exhaust air chamber that is configured for cooling the rotor active unit and the stator active unit, the air-conveying device for cooling the rotor active unit and the stator active unit
      supplying cooling air (C) to the air gap (S) by way of the air supply duct, and
      discharging from the air gap cooling air (H) heated by the rotor active unit and the stator active unit by way of the exhaust air chamber,
   the air supply duct being in particular fluidically connected to the at least one air inlet duct.
13. A wind power installation, having a generator as per one of the preceding embodiments 1 to 12.

BRIEF DESCRIPTION OF THE SEVERAL VIEWS OF THE DRAWINGS

Preferred exemplary embodiments will be described in an exemplary manner by means of the appended figures in which.

Identical elements, or elements which are substantially of equivalent function, are provided with the same reference signs in the figures. General descriptions typically refer to all embodiments unless differences are explicitly stated.

DETAILED DESCRIPTION

The explanation of the invention by means of examples with reference to the figures takes place in a substantially schematic manner, and the elements which are explained in the respective figure may be exaggerated therein for improved visualization, and other elements may be simplified. For example, FIG. 1 thus visualizes a wind power installation per se in a schematic manner such that the generator cannot be seen in detail.

Figure 1:
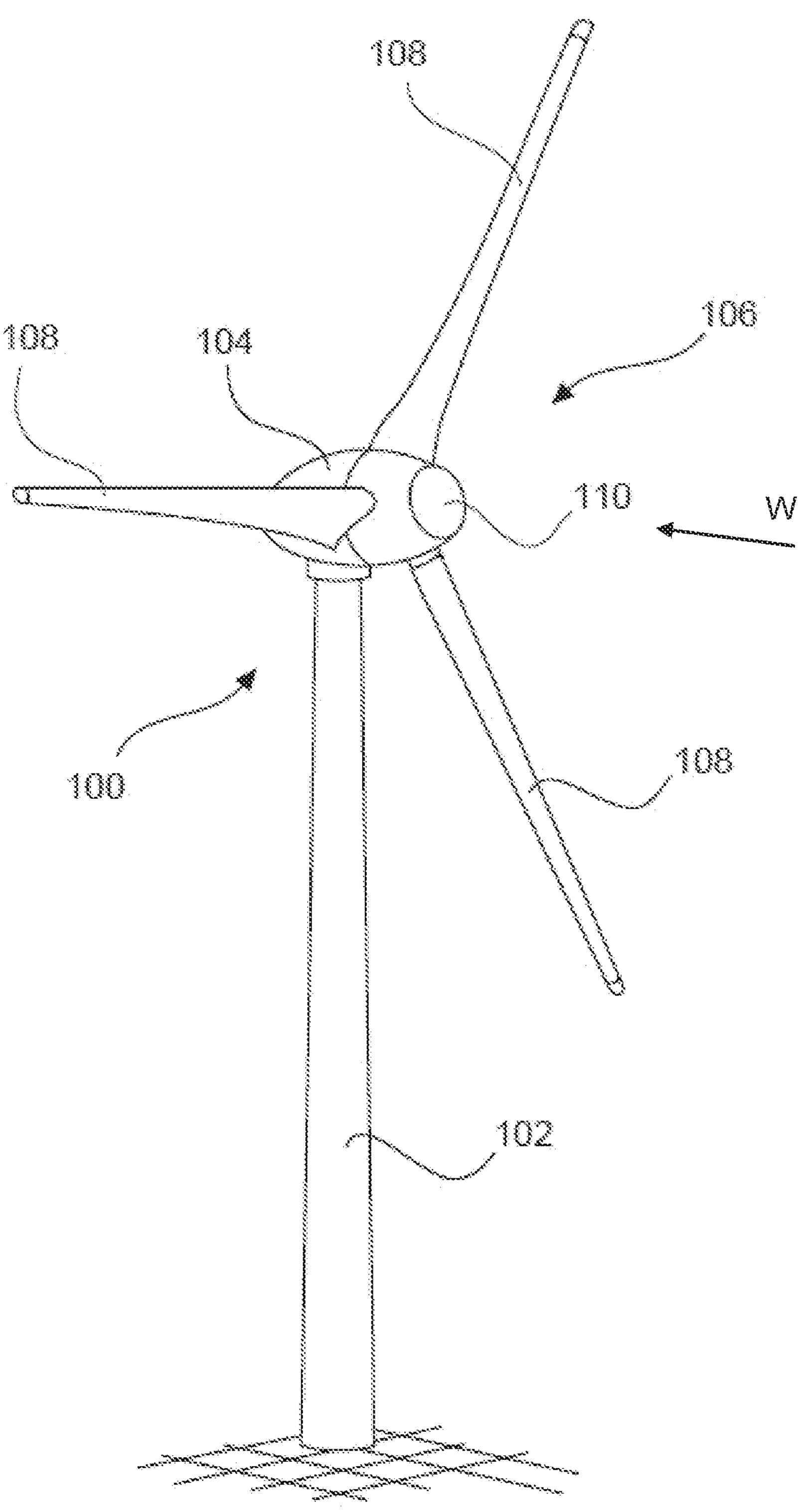
FIG. 1 shows a schematic, three-dimensional view of an exemplary embodiment of a wind power installation.

FIG. 1 shows a schematic, three-dimensional view of a wind power installation 100. The wind power installation 100 has a tower 102 and a nacelle 104 on the tower 102. The tower 102 here may be composed of tower segments disposed on one another. An aerodynamic rotor 106 having three rotor blades 108 and a spinner 110 is provided on the nacelle 104. During the operation of the wind power installation 100, the aerodynamic rotor 106 is set in rotation by the wind W and thus also rotates an electrodynamic rotor of a generator 10, the latter being coupled directly or indirectly to the aerodynamic rotor 106. The generator 10 is disposed in the nacelle 104 and generates electric power.

Figure 2:
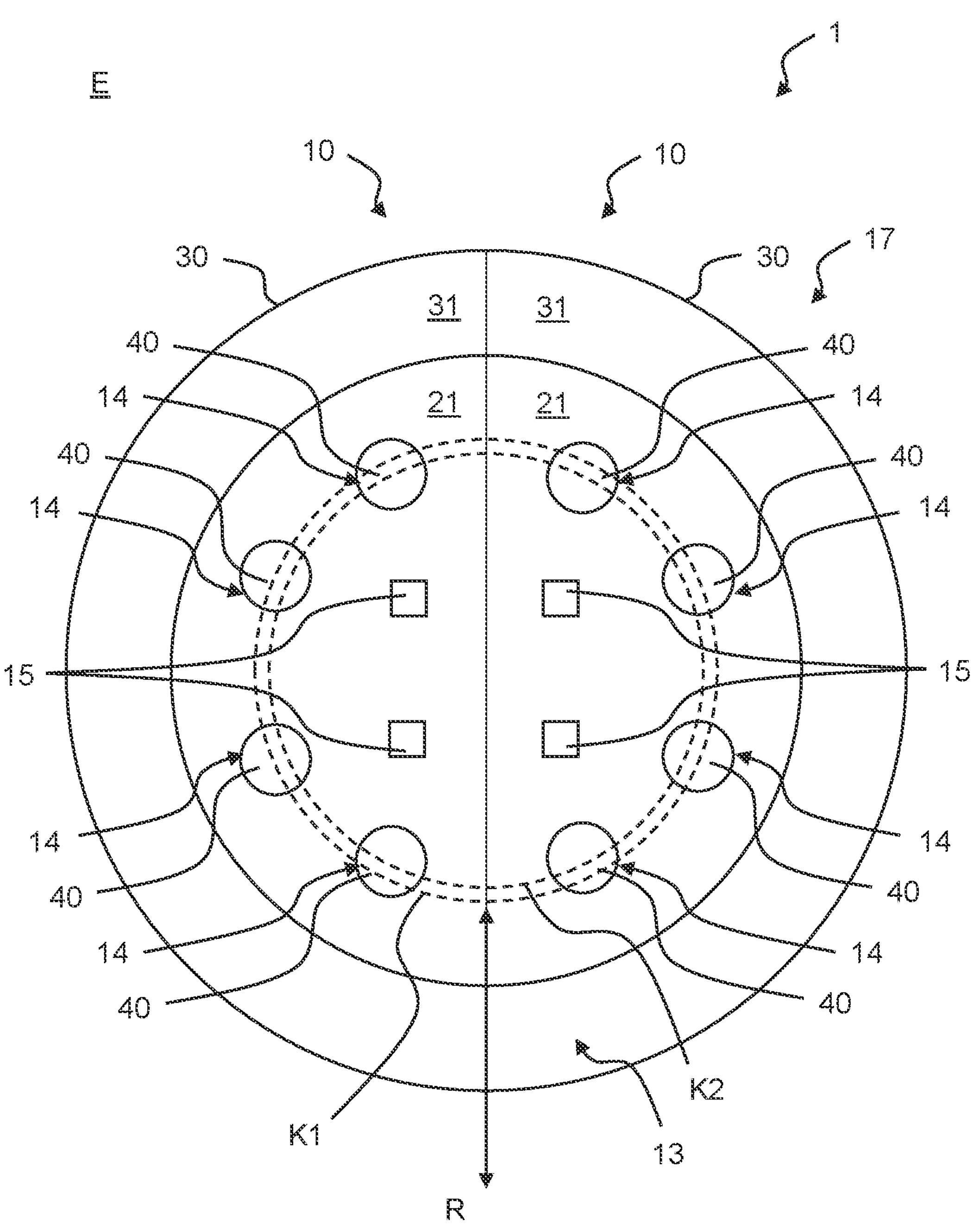
FIG. 2 shows a plan view from above of a preferred embodiment of a generator.
Figure 3:
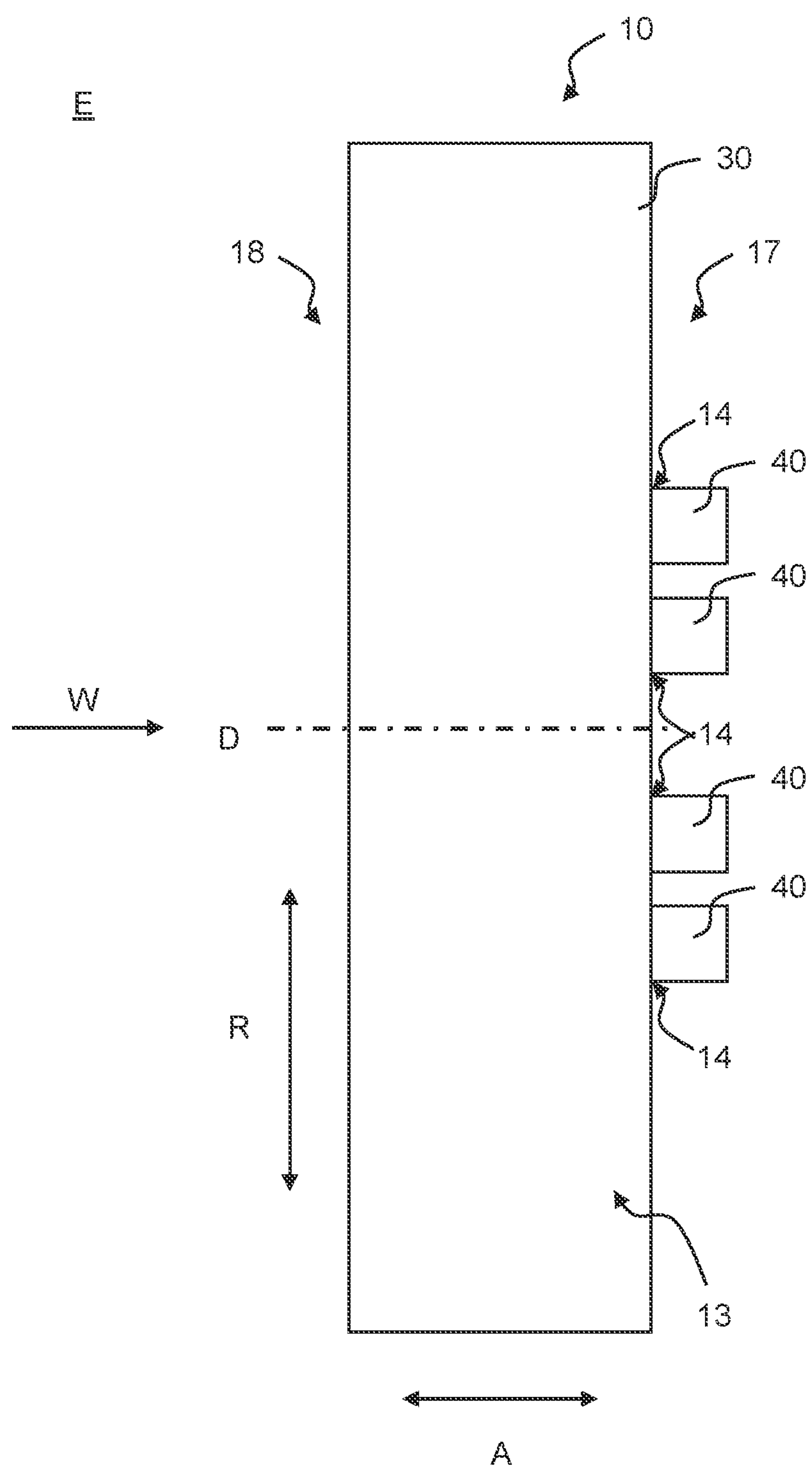
FIG. 3 shows a lateral view of the generator illustrated in FIG. 2, in a plan view from above.

FIGS. 2 and 3 show a preferred embodiment of a generator 10 for such a wind power installation 100 for generating electric power. FIG. 2 shows the generator 10 in a plan view from above, and FIG. 3 shows the generator 10 in a lateral view. The generator 10 in this preferred embodiment is configured as an external rotor.

The generator 10 has a generator housing having an external side 13 which faces an environment E of the generator 10. Furthermore, the generator 10 has an internal side 12 (not illustrated in FIGS. 2 and 3) which faces a generator interior space 16 (not illustrated in FIGS. 2 and 3) and lies opposite the external side 13. The generator interior space 16 in the axial direction A, in spatial terms, is delimited by two end sides 17, 18, an end side (downwind end side) which in the operating state faces away from the wind W, and an end side 18 (upwind end side) which in the operating state faces the wind W. In the present embodiment, a rotor downwind cladding element 31 and a stator cladding element 21 form the downwind end side 17, and a rotor upwind cladding element 32 forms the upwind end side 18, for example. The two end sides 17, 18 have in each case one internal side 12 and one external side 13.

The generator 10 has eight air outlet ducts 14 and four air inlet ducts 15, which extend between the internal side 12 and the external side 13 and fluidically connect the generator interior space 16 to the environment E. The air inlet ducts here are configured such that air from the environment E enters the generator interior space 16. The air outlet ducts are configured such that air from the generator interior space 16 passes into the environment E. It can be seen that the two left and two right air outlet ducts illustrated in FIG. 2 are disposed on an orbit K1, and the two upper and two lower air outlet ducts are disposed on an orbit K2 which is different from the orbit K1.

The air outlet ducts 14 in the present preferred embodiment are configured so as to be cylindrical. The air inlet ducts 15 in the present preferred embodiment are configured so as to be polygonal. Both the air outlet ducts 14 and the air inlet ducts 15 extend substantially in the axial direction A. Both the air outlet ducts 14 and the air inlet ducts 15 in this preferred embodiment of the generator are disposed on the same end side, here being configured on the downwind end side 17 in the stator cladding element 21. This means that the air outlet ducts 14 and the air inlet ducts 15 are disposed on that end side 17 of the generator 10 that in the operating state of the generator 10 is the end side 17 that faces away from the wind W; in other words, the air outlet ducts 14 and the air inlet ducts 15 in the operating state of the generator 10 are situated on that end side 10 that faces the nacelle 104, or the machine room, respectively.

Eight silencers 40 are releasably disposed on the generator 10. Specifically, one silencer 40 is in each case disposed on one air outlet duct 14. The silencers 40 are disposed on the air outlet ducts 14 in such a manner that the silencers 40 extend through the respective air outlet duct 14. The silencers 40 in the axial direction A have a length which necessitates that the silencers 40 extend beyond the external side 13, i.e., into the environment E. In the preferred embodiment, the silencers 40 are configured as duct silencers. However, it may also be preferable for splitter silencers to be provided as silencers 40. Additionally or alternatively, sound-absorbing elements 40 can also be disposed on the air outlets 14.

Figure 4:
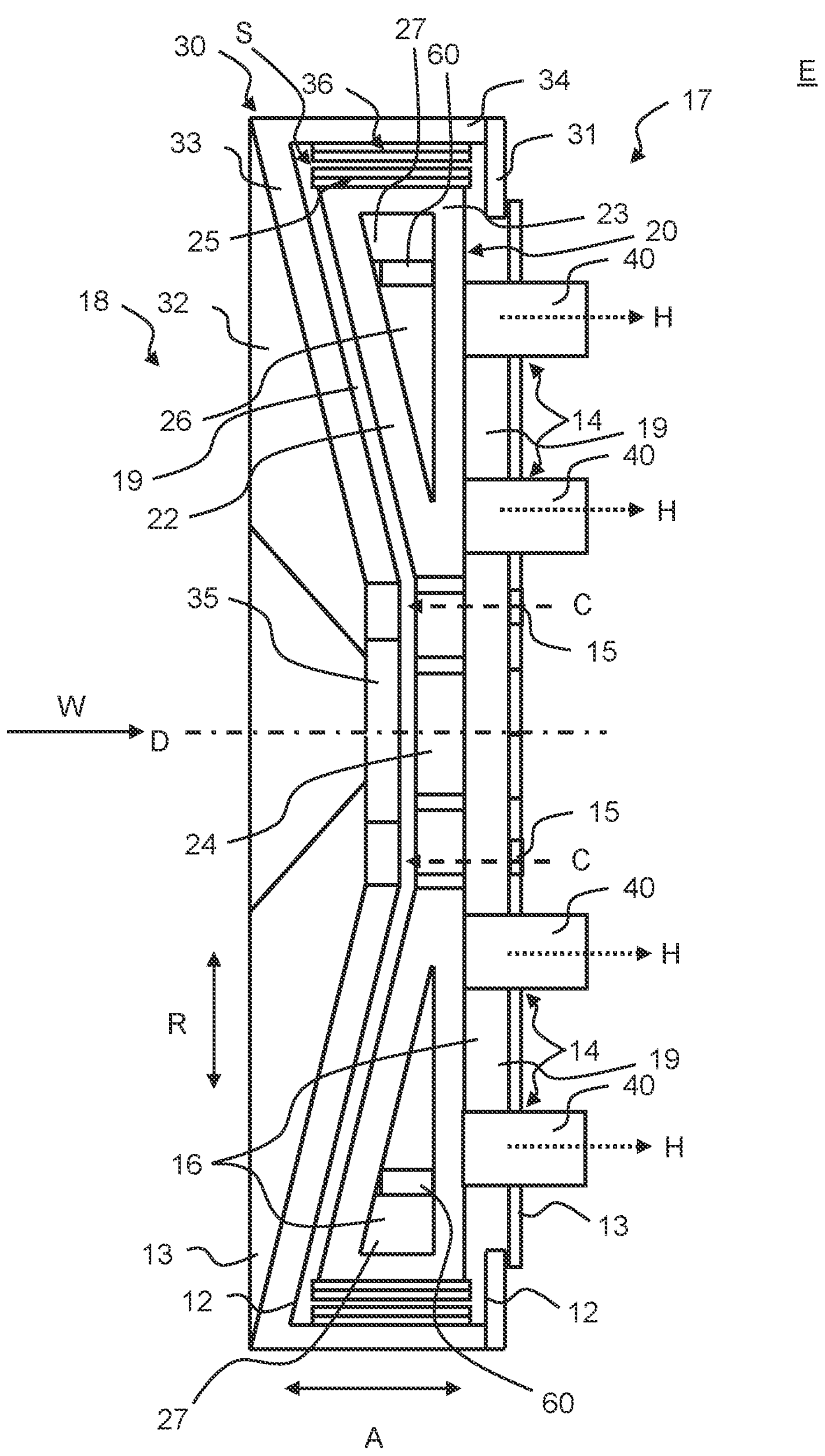
FIG. 4 shows a sectional view of the generator illustrated in FIG. 3, in a lateral view.

FIG. 4 shows a sectional view of the generator 10 illustrated in FIGS. 2 and 3. This sectional view shows the generator interior space 16 of the generator 10 in detail. It can be seen that the rotor 30 has a rotor active unit 36 on a magnet support segment 34 which by way of a rotor support structure 33 is held so as to be rotatable about a rotation axis D. It can furthermore be seen that the stator 20 has a stator active unit 25 on a coil support segment 23 which by way of a stator support structure 22 is disposed so as to be coaxial with the rotation axis D. The rotor 30 is disposed so as to be rotatable relative to the stator 20 about the rotation axis D.

Rotor 30 and stator 20 are mutually positioned in such a manner that the rotor active unit 36 and the stator active unit 25 are disposed so as to be mutually spaced apart by an air gap S. Cooling air C for cooling the generator 10 is guided through the air gap S. To this end, during operation cooling air C is guided to the air gap S by way of an air supply duct 19 which is fluidically connected to the air inlet ducts 15. The air supply duct 19 here is configured in such a manner that the cooling air C in terms of the rotation axis D is guided outward substantially in the radial direction R, in the direction of the magnet support segment 34. The air supply duct 19 here is formed by the rotor and the stator which is disposed so as to be spaced apart from the rotor. The air supply duct 19 in the present case is formed in particular by the rotor support structure 33 having the rotor upwind cladding element 32 and the stator support structure 22, on the one hand, and by the stator cladding element 21, or the rotor downwind cladding element 31, respectively, and the stator support structure 22, on the other hand.

The cooling air H, which has been heated by the rotor active unit 36 and the stator active unit 25, from the air gap S, which fluidically connects the exhaust air chambers 27 to the upstream air supply duct 19, is in turn discharged inward in the radial direction R by way of exhaust air chambers 27. To this end, the exhaust air chambers are disposed within the stator 20, or within the stator support structure 22 of the stator 20, respectively. The exhaust air chambers 27 are thus configured for discharging the heated cooling air H substantially in a radial direction R in terms of the rotation axis D.

For conveying the cooling air C, or the heated cooling air H, respectively, through the generator interior space 16, the generator has a plurality of air-conveying devices 60, for example ventilators, which are fluidically connected to the air outlet ducts 14 by way of a pressurized chamber 26. The pressurized chamber 26 is thus disposed between the air outlet ducts 14 and the exhaust air chambers 27, or the air-conveying devices 60, respectively, and fluidically connects the exhaust air chambers 27 to the air outlet ducts 14 by way of the air-conveying devices 60. To this end, the air-conveying devices 60 are disposed downstream of the exhaust air chambers 27.

Figure 5:
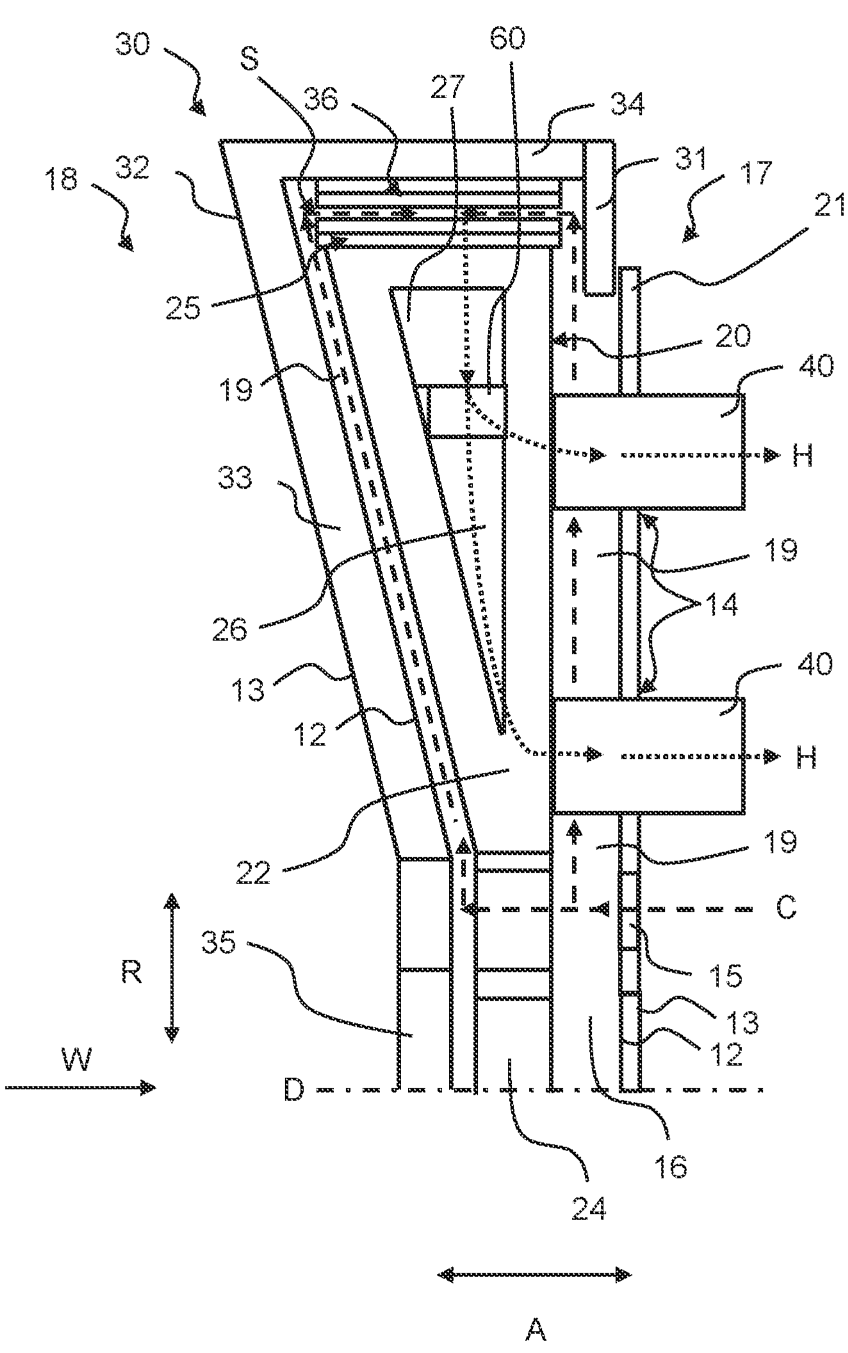
FIG. 5 shows a detailed view of the generator illustrated in FIG. 4, in a sectional view.

FIG. 5 shows a detailed view of the sectional view illustrated in FIG. 4. The guiding of the cooling air C (dashed line) and of the heated cooling air H (dotted line) becomes apparent from the detailed view of FIG. 5. It can be seen that the cooling air C enters the generator interior space 16 by way of the air inlet ducts 15 and is supplied to the air gap S between the active units 25, 36 by way of the air supply ducts. The air-conveying devices, which are disposed downstream of the air gap S within the stator support structure 22, suction the heated cooling air H by way of exhaust air chambers 27, and convey the heated cooling air H through the pressurized chamber 26 and through the silencers 40, which are disposed in the air outlet ducts 14, into the environment E.

Figure 6:
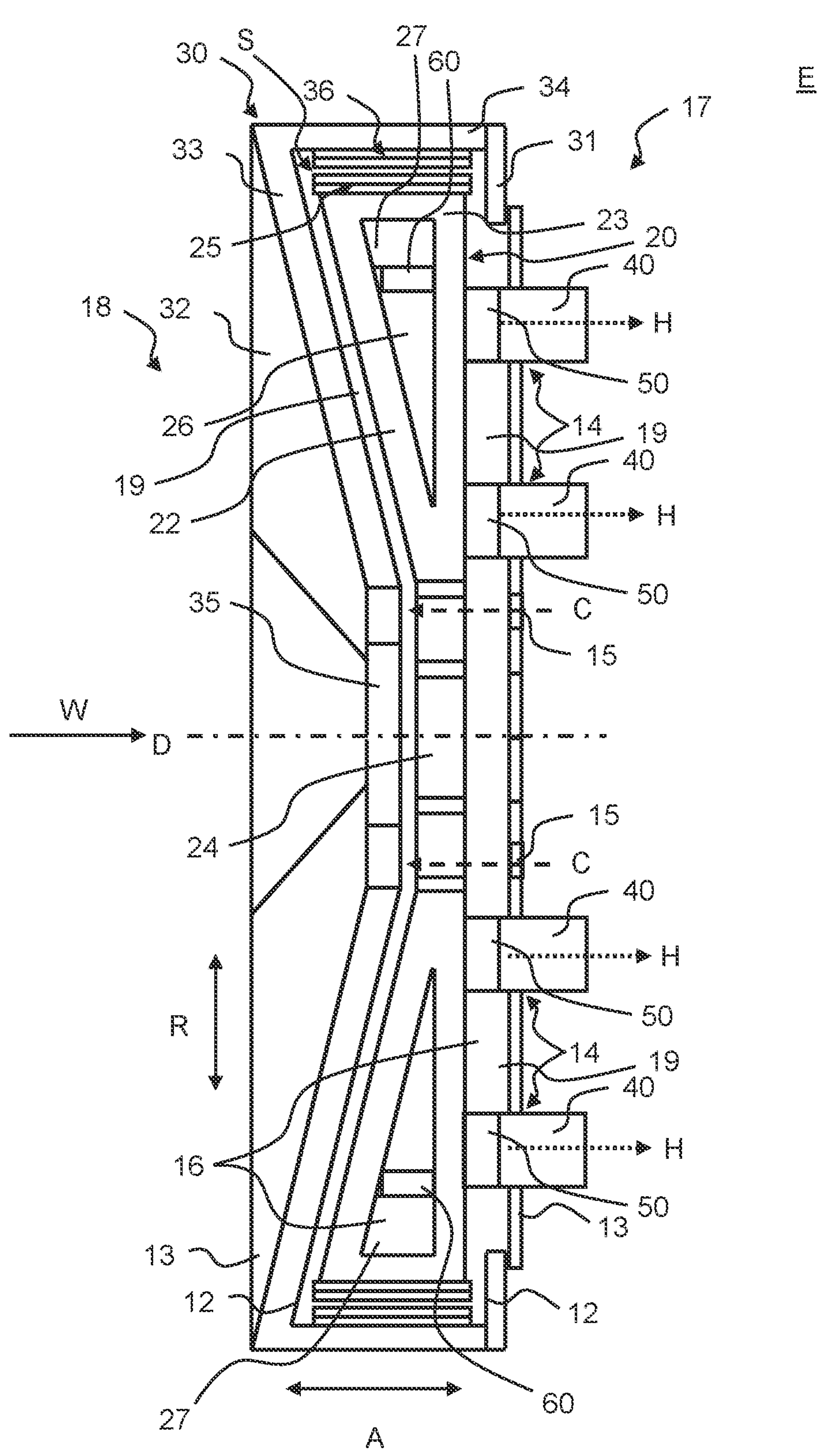
FIG. 6 shows a sectional view of a further preferred embodiment of a generator.

FIG. 6 shows a sectional view of a further preferred embodiment of a generator 10. This further embodiment is based substantially on the preferred embodiment of the generator 10 illustrated in FIGS. 2 to 5.

The embodiment shown in FIG. 6 furthermore has a plurality of shut-off units 50. It is provided here that one shut-off unit 50 is assigned to each air outlet duct 14. To this end, the shut-off units within the generator interior space 16 are disposed so as to be upstream of the silencers 40. The shut-off units 50 are, for example, louver blades or duct flaps which are variable between an open position and a blocking position different from the open position. In the open position, the shut-off units 50 fluidically connect the pressurized chamber to the air outlet ducts 14, or the silencers 40, respectively. In the blocking position, the shut-off units 50 prevent environmental influences, i.e., dirt, rain or the like, from entering the generator interior space 16 from the environment E.

LIST OF REFERENCE SIGNS

10 Generator
12 Internal side
13 External side
14 Air outlet duct
15 Air inlet duct
16 Generator interior space
17 Downwind end side
18 Upwind end side
19 Air supply duct
20 Stator
21 Stator cladding element
22 Stator support structure
23 Coil support element
25 Stator active unit or coil unit
26 Pressurized chamber
27 Exhaust air chamber
30 Rotor
31 Rotor downwind cladding element
32 Rotor upwind cladding element
33 Rotor support structure
34 Magnet support segment
36 Rotor active unit or magnet units
40 Silencer
50 Shut-off unit
60 Air-conveying device
100 Wind power installation
102 Tower
104 Nacelle
106 Aerodynamic rotor
108 Rotor blades
110 Spinner
A Axial direction
C Cooling air
D Rotation axis
E Environment
H Heated cooling air, hot air
K1,2 Orbits
R Radial direction
S Air gap
W Wind (direction)

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A generator comprising:
an air supply duct and an exhaust air chamber fluidically coupled to the air supply duct, the air supply duct being upstream of the exhaust air chamber;
a stator having a stator active unit; and
a rotor disposed so as to be rotatable relative to the stator about a rotation axis and having a rotor active unit,
wherein the rotor active unit and the stator active unit is disposed so as to be mutually spaced apart by an air gap, wherein the exhaust air chamber is fluidically coupled to the upstream air supply duct by the air gap,
wherein an air-conveying device is disposed downstream of the exhaust air chamber and is configured for cooling the rotor active unit and the stator active unit by:
supplying cooling air to the air gap by way of the air supply duct, and
discharging from the air gap cooling air heated by the rotor active unit and the stator active unit by way of the exhaust air chamber, wherein the exhaust air chamber is configured for discharging the heated cooling air substantially in a radial direction with respect to the rotation axis,
wherein the stator and/or the rotor at least in portions forms the exhaust air chamber,
wherein the exhaust air chamber is within the stator,
wherein the stator has a pressurized chamber,
wherein the pressurized chamber is disposed between at least one air outlet duct and the exhaust air chamber, and fluidically connects the at least one air outlet duct to the exhaust air chamber,
wherein the air-conveying device is between the exhaust air chamber and the pressurized chamber,
wherein the exhaust air chamber by way of the air-conveying device is fluidically coupled to the pressurized chamber, and
wherein the air-conveying device is within the stator.

2. The generator as claimed in claim 1, wherein the air supply duct is configured to supply the cooling air substantially in the radial direction.

3. The generator as claimed in claim 1, wherein the exhaust air chamber is a plurality of exhaust air chambers.

4. The generator as claimed in claim 1, wherein:

at least the stator or the rotor form at least portions of the air supply duct, wherein the air supply duct is between:

a stator support structure of the stator and a rotor support structure of the rotor, and/or a stator cladding element of the stator and the stator support structure of the stator, and/or a rotor downwind cladding element of the rotor and the stator support structure of the stator.

5. The generator as claimed in claim 1, the generator comprising:

a generator housing having:

an internal side facing a generator interior space of the generator, and an external side opposite the internal side and facing an environment of the generator, and at least one air outlet duct extending between the internal side and the external side, the at least one air outlet duct fluidically connecting the exhaust air chamber to the environment, and/or at least one air inlet duct extending between the internal side and the external side, the at least one air inlet duct fluidically connecting the generator interior space to the environment.

6. The generator as claimed in claim 5 comprising:

opposing first and second sides, the generator interior space of the generator extending between the first and second sides in an axial direction, wherein the at least one air outlet duct is disposed on an end side of the generator, and/or wherein the at least one air inlet duct is disposed on one of the first and second end sides of the generator.

7. The generator as claimed in claim 5, wherein:

the at least one air outlet duct is disposed on that end side of the generator that in an operating state of the generator is the end side that faces away from the wind, and/or the at least one air inlet duct is disposed on that end side of the generator that in an operating state of the generator is the end side that faces away from the wind.

8. The generator as claimed in claim 5, wherein:

the air-conveying device comprises a ventilator.

9. The generator as claimed in claim 5, wherein the air supply duct is fluidically connected to the at least one air inlet duct.

10. The generator as claimed in claim 5 comprising:

at least one silencer on the generator, and the at least one silencer being releasably disposed on the generator.

11. The generator as claimed in claim 10, wherein:

the at least one silencer is located at the at least one air outlet duct, and the at least one silencer having at least one of a duct silencer, a splitter silencer, or sound- absorbing elements.

12. The generator as claimed in claim 11, wherein the at least one silencer extends beyond the external side of the generator housing.

13. The generator as claimed in claim 1 comprising a shut-off unit, wherein the shut-off unit is variable between an open position and a blocking position different from the open position, and wherein the shut-off unit is a louver blade or a duct flap.

14. The generator as claimed in claim 1, wherein at least one air outlet duct is configured so as to be cylindrical shaped or polygonal shaped.

15. A wind power installation comprising the generator as claimed in claim 1.

* * * * *